(12) United States Patent
Zhang et al.

(10) Patent No.: US 12,223,130 B2
(45) Date of Patent: Feb. 11, 2025

(54) TOUCH PANEL AND DISPLAY APPARATUS

(71) Applicant: Yungu (Gu'an) Technology Co., Ltd., Hebei (CN)

(72) Inventors: Haofeng Zhang, Langfang (CN); Rui Guo, Langfang (CN); Meng Zhang, Langfang (CN); Ching Tung Hsu, Langfang (CN)

(73) Assignee: YUNGU (GU'AN) TECHNOLOGY CO., LTD., Langfang (CN)

( * ) Notice: Subject to any disclaimer, the term of this patent is extended or adjusted under 35 U.S.C. 154(b) by 0 days.

(21) Appl. No.: 18/508,684

(22) Filed: Nov. 14, 2023

(65) Prior Publication Data

US 2024/0077967 A1   Mar. 7, 2024

Related U.S. Application Data

(63) Continuation of application No. PCT/CN2022/121944, filed on Sep. 28, 2022.

(30) Foreign Application Priority Data

Jan. 28, 2022 (CN) .......................... 202210109224.0

(51) Int. Cl.
*G06F 3/041* (2006.01)
*G06V 40/13* (2022.01)

(52) U.S. Cl.
CPC ........ *G06F 3/0412* (2013.01); *G06V 40/1306* (2022.01)

(58) Field of Classification Search
CPC ......... G06F 3/0412; G06F 2203/04112; G06V 40/1306

See application file for complete search history.

(56) References Cited

U.S. PATENT DOCUMENTS 11,086,439 B2   8/2021 Ding et al.
11,474,637 B2 * 10/2022 Ge ..................... G06V 40/1306
(Continued)

FOREIGN PATENT DOCUMENTS

CN   108021288 A   5/2018
CN   108089757 A   5/2018
(Continued)

OTHER PUBLICATIONS

International Search Report and Written Opinion issued on Dec. 20, 2022, in corresponding International Application No. PCT/CN2022/121944, 13 pages.

(Continued)

*Primary Examiner* — Michael Pervan
(74) *Attorney, Agent, or Firm* — Maier & Maier, PLLC

(57) ABSTRACT

A touch panel and a display apparatus. The touch panel has a touch region and a fingerprint identification region and includes a first metal mesh layer, a second metal mesh layer, and a dielectric layer. The first metal mesh layer includes a plurality of touch electrodes disposed in the touch region and a plurality of fingerprint identification electrodes disposed in the fingerprint identification region. The second metal mesh layer includes a plurality of fingerprint lead wires. Each of the plurality of fingerprint lead wires is electrically connected to corresponding one of the plurality of fingerprint identification electrodes. The dielectric layer is disposed between the first metal mesh layer and the second metal mesh layer. The dielectric layer is provided with a plurality of contact holes via which the identification lead wires are electrically connected to the fingerprint identification electrodes.

20 Claims, 4 Drawing Sheets

(56) References Cited

U.S. PATENT DOCUMENTS

| | | |
|---|---|---|
| 2019/0286264 A1 | 9/2019 | Li et al. |
| 2019/0294846 A1 | 9/2019 | Li et al. |
| 2022/0157075 A1 | 5/2022 | Li et al. |
| 2022/0187973 A1* | 6/2022 | Ge .................. G06F 3/0446 |
| 2022/0320237 A1 | 10/2022 | Liu et al. |

FOREIGN PATENT DOCUMENTS

| | | |
|---|---|---|
| CN | 108196735 A | 6/2018 |
| CN | 108398822 A | 8/2018 |
| CN | 208126362 U | 11/2018 |
| CN | 109062430 A | 12/2018 |
| CN | 110034168 A | 7/2019 |
| CN | 209297323 A | 8/2019 |
| CN | 110427121 A | 11/2019 |
| CN | 110427125 A | 11/2019 |
| CN | 111240516 A | 6/2020 |
| CN | 113224122 A | 8/2021 |
| CN | 113451376 A | 9/2021 |
| CN | 113557470 A | 10/2021 |
| CN | 113867570 A | 12/2021 |
| CN | 2021254490 A1 | 12/2021 |
| CN | 114510160 A | 5/2022 |
| WO | 2021223305 A1 | 11/2021 |

OTHER PUBLICATIONS

Chinese Office Action issued on Jun. 28, 2023, in corresponding Chinese Application No. 202210109224.0, 22 pages.
Office Action issued on May 24, 2024, in corresponding Chinese Application No. 202210109224.0, 12 pages.

\* cited by examiner ated on Jan. 28, 2022. The contents of
TOUCH PANEL AND DISPLAY APPARATUS

CROSS-REFERENCE TO RELATED APPLICATIONS

This application is a continuation of international patent application No. PCT/CN2022/121944, filed on Sep. 28, 2022, which claims priority to Chinese Patent Application No. 2022101092240, entitled "TOUCH PANEL AND DISPLAY APPARATUS" filed on Jan. 28, 2022. The contents of the above identified applications are hereby incorporated herein in their entireties by reference.

TECHNICAL FIELD

The present application relates to the field of display technology, and specifically to a touch panel and a display apparatus.

BACKGROUND

Currently, the organic light-emitting diode (OLED) display device has been widely used in mobile terminals with functions such as payment, communication, and file management, due to its advantages of self-illumination, high contrast, small thickness, wide viewing angle, fast response speed, etc. A display panel has been developed in which a fingerprint identification module is integrated into a touch layer such that at least part of the display panel has both functions of touch and fingerprint identification. However, the arrangement density of fingerprint identification electrodes is much greater than the arrangement density of conventional touch electrodes. In addition, lead wires of the fingerprint identification electrodes have to pass through the touch region to be connected to the control chip. As a result, not only the arrangement of the lead wires is limited, but the optical uniformity around the fingerprint identification region is affected.

SUMMARY

A touch panel is provided in the present application. The touch panel has a touch region and a fingerprint identification region and includes a first metal mesh layer, a second metal mesh layer, and a dielectric layer. The first metal mesh layer includes a plurality of touch electrodes disposed in the touch region and a plurality of fingerprint identification electrodes disposed in the fingerprint identification region. The second metal mesh layer includes a plurality of fingerprint lead wires. Each of the plurality of fingerprint lead wires is electrically connected to corresponding one of the plurality of fingerprint identification electrodes. The dielectric layer is disposed between the first metal mesh layer and the second metal mesh layer. The dielectric layer is provided with a plurality of contact holes. Each of the plurality of fingerprint lead wires is electrically connected to the corresponding one of the plurality of fingerprint identification electrodes by corresponding one of the plurality of contact holes.

A display apparatus is further provided in the present application. The display apparatus includes the touch panel as described above.

DETAILED DESCRIPTION

It should be noted that when an element is referred to as being "fixed to" the other element, it may be directly fixed to the other element or there may be an intermediate element. When one element is considered to be "connected to" the other element, it may be directly connected to the other element or there may be an intermediate element. As used herein, the terms "perpendicular", "horizontal", "left", "right" and the like are used for purposes of illustration only.

Figure 1:
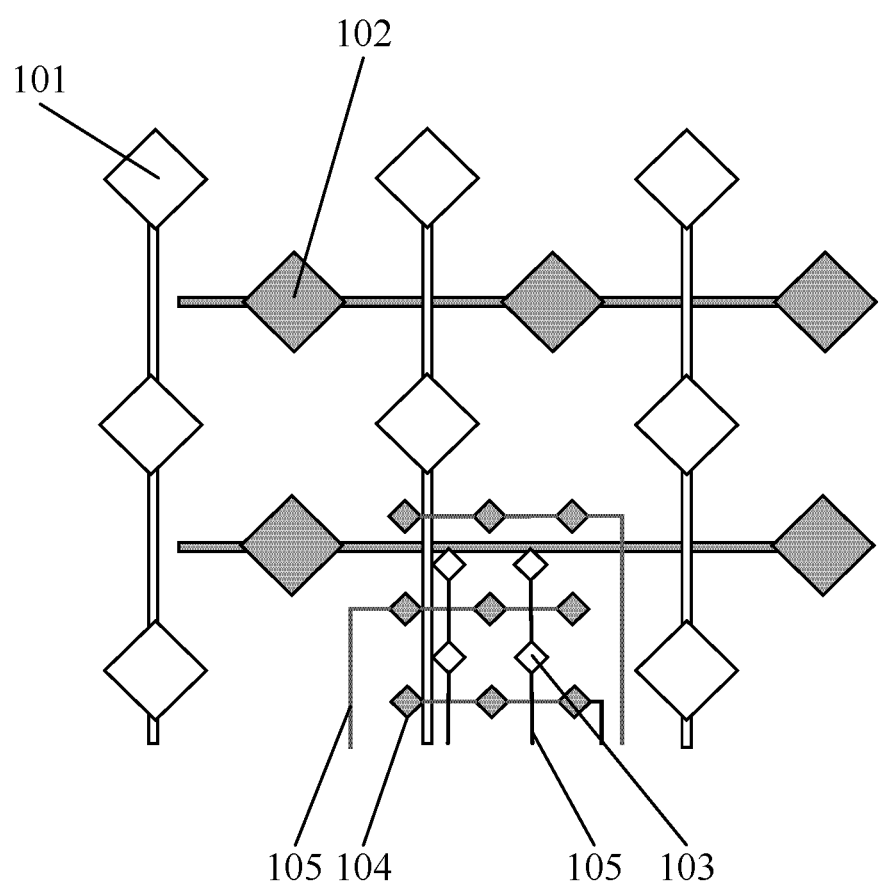
FIG. 1 is a schematic view of a partial structure of a touch panel having the function of fingerprint identification.

As shown in FIG. 1, a conventional touch panel includes a touch region and a fingerprint identification region. The touch region includes a plurality of first electrodes 101 and a plurality of second electrodes 102 arranged in a crossed pattern. Specifically, the plurality of first electrodes 101 are arranged in rows along a direction, and the plurality of second electrodes 102 are arranged in columns along another direction.

Capacitances are formed between the first electrodes 101 and the second electrodes 102. The plurality of first electrodes 101 sequentially send excitation signals, while the plurality of second electrodes 102 receive the excitation signals, thereby forming capacitances between individual first electrodes 101 and individual second electrodes 102. When a finger performs a touch action on the display panel, the capacitances between part of the first electrodes 101 and part of the second electrodes 102 around the touch point are changed, and the position of the touch action can be determined on basis of such change.

Likewise, the fingerprint identification region includes a plurality of third electrodes 103 and a plurality of fourth electrodes 104 arranged in a crossed pattern. The plurality of the third electrodes 103 and the plurality of the fourth electrodes 104 are arranged in rows and columns, respectively. The third electrodes 103 and the fourth electrodes 104 are led outwardly through respective fingerprint lead wires 105.

The ridges and the valleys of the fingerprint can be identified on basis of the changes of capacitances between the third electrodes 103 and the fourth electrodes 104. Compared with the identification of the touch action, the fingerprint identification requires to further identify the ridges and the valleys of the fingerprint after the finger has been identified. Therefore, the density of the electrode pattern in the fingerprint identification region is much greater than the density of the electrode pattern in the touch region. The density of the fingerprint lead wires 105 is correspondingly greater than the density of the electrode pattern in the touch region, resulting in that not only the arrangement of the fingerprint lead wires 105 is limited by the first electrodes 101 and the second electrodes 102, but also the optical uniformity of the touch panel is affected.

In view of the above, a touch panel is provided in the present application. The touch panel has a touch region and a fingerprint identification region. The touch panel includes a first metal mesh layer, a second metal mesh layer, and a dielectric layer. The first metal mesh layer includes a plurality of touch electrodes disposed in the touch region and a plurality of fingerprint identification electrodes disposed in the fingerprint identification region. The second metal mesh layer includes a plurality of fingerprint lead wires. Each of the plurality of fingerprint lead wires is electrically connected to corresponding one of the plurality of fingerprint identification electrodes. The dielectric layer is disposed between the first metal mesh layer and the second metal mesh layer. The dielectric layer is provided with contact holes. The fingerprint lead wires are electrically connected to the fingerprint identification electrodes corresponding thereto via the contact holes, respectively. In this way, the fingerprint lead wires connected to the fingerprint identification electrodes are located in different metal mesh layer from the touch electrodes, so that the arrangement of the fingerprint lead wires is no longer limited by the touch electrodes, and the optical uniformity around the fingerprint identification region is improved.

The touch panel provided in the embodiments of the present application can be an OLED display panel, which can be applied to an electronic apparatus such as a mobile phone terminal, a tablet computer, a notebook computer, a wearable apparatus, and a vehicle-mounted apparatus.

Figure 2:
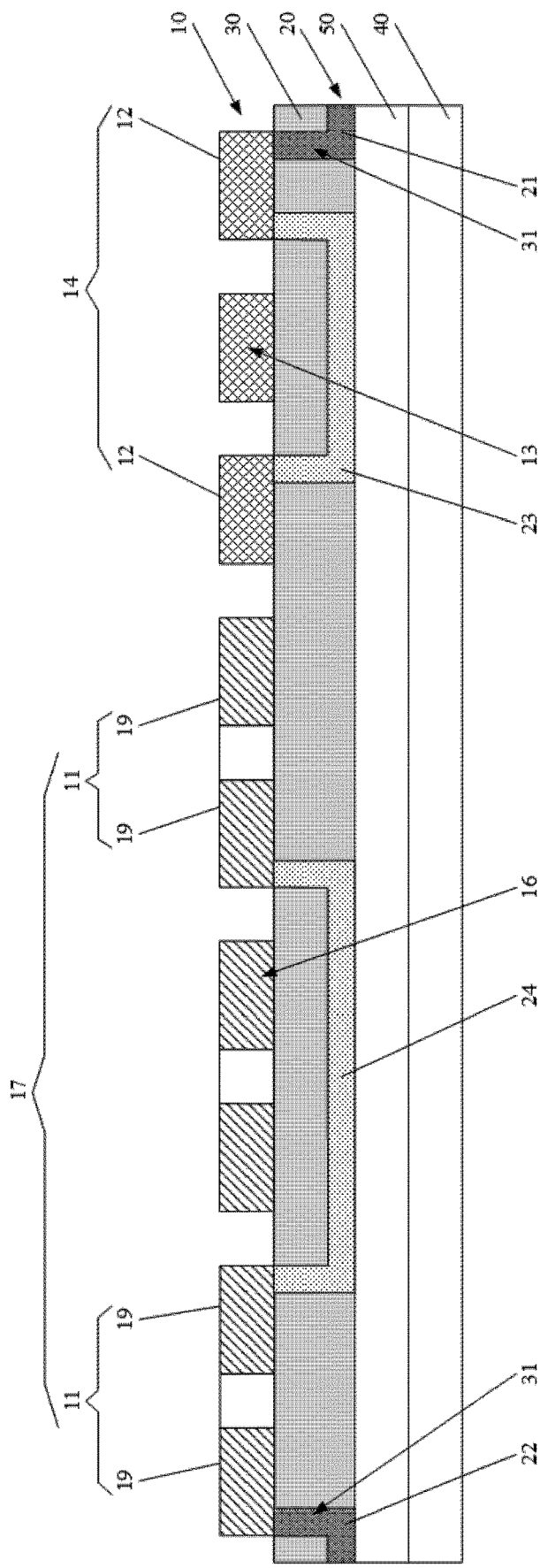
FIG. 2 is a schematic view of a layer structure of a touch panel according to an embodiment of the present application.

Referring to FIG. 2, a touch panel is provided in embodiments of the present application. The touch panel includes a first metal mesh layer 10, a second metal mesh layer 20, a dielectric layer 30, and a substrate 40.

Figure 3:
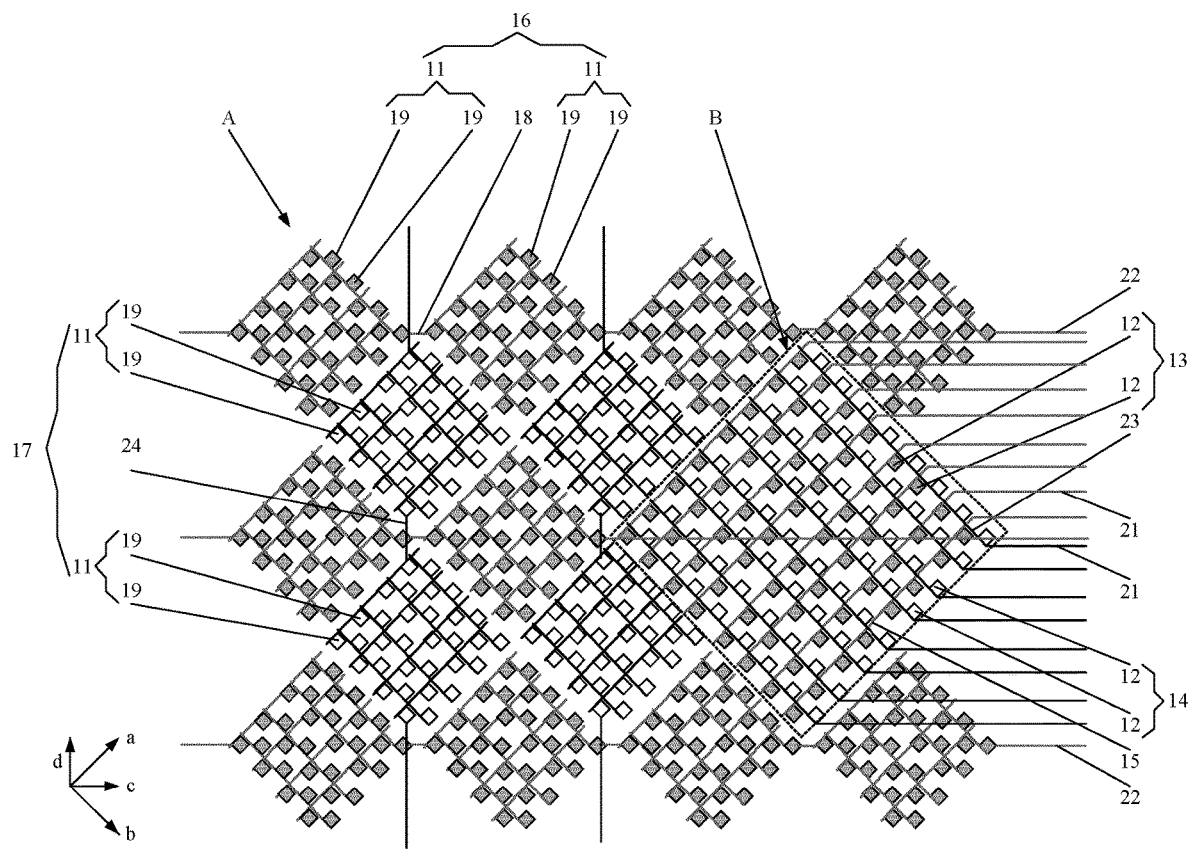
FIG. 3 is a schematic view of an entire structure of a first metal mesh layer and a second metal mesh layer according to an embodiment of the present application.

Further referring to FIG. 3, the touch panel has a touch region A and a fingerprint identification region B. The first metal mesh layer 10 includes a plurality of touch electrodes 11 disposed in the touch region A and a plurality of fingerprint identification electrodes 12 disposed in the fingerprint identification region B.

The second metal mesh layer 20 includes a plurality of fingerprint lead wires 21. Each of the plurality of fingerprint lead wires 21 is electrically connected to corresponding one of the plurality of fingerprint identification electrodes 12. The dielectric layer 30 is disposed between the first metal mesh layer 10 and the second metal mesh layer 20. The dielectric layer 30 is provided with contact holes 31. The fingerprint lead wires 21 are respectively and electrically connected to the fingerprint identification electrodes 12 corresponding thereto via the contact holes 31. Specifically, the fingerprint lead wires 21 can be electrically connected to the fingerprint identification electrodes 12 corresponding thereto by filling the contact holes 31 with a conductive material during the preparation of the first metal mesh layer 10 or the second metal mesh layer 20. More specifically, the fingerprint lead wires 21 can be electrically connected to the fingerprint identification electrodes 12 corresponding thereto by filling the contact holes 31 with a conductive material different from materials of the first metal mesh layer 10 and the second metal mesh layer 20. As the fingerprint lead wires connected to the fingerprint identification electrodes are located in different metal mesh layer from the touch electrodes, the arrangement of the fingerprint lead wires is no longer limited by the touch electrodes, and the optical uniformity around the fingerprint identification region is improved.

Specifically, the dielectric layer 30 can be a monolayer structure or a multilayer laminated structure. When the dielectric layer 30 is a monolayer structure, the material of the monolayer structure is an insulating material. When the dielectric layer 30 is a multilayer structure, the materials of respective layers can be the same or different, and the material of at least one layer is an insulating material.

In some embodiments of the present application, as shown in FIG. 3, the touch region A at least partially surrounds the fingerprint identification region B. Specifically, in case that the fingerprint identification region B is adjacent to an edge of the touch panel, the touch region A partially surrounds the fingerprint identification region B. In case that the fingerprint identification region B is away from the edge of the touch panel, the touch region A entirely surrounds the fingerprint identification region B.

As shown in FIG. 2, the substrate 40 is located under the first metal mesh layer 10 and the second metal mesh layer 20. An array layer and a light-emitting layer 50 are sequentially stacked on the substrate 40.

In some embodiments of the present application, as shown in FIG. 2, the second metal mesh layer 20 is located between the first metal mesh layer 10 and the substrate 40. In other words, the second metal mesh layer 20 is located under the first metal mesh layer 10. This can avoid the second metal mesh layer 20 to be located above the first metal mesh layer 10 causing shielding to the capacitance and affecting the functions of touch and fingerprint identification.

In some embodiments of the present application, as shown in FIG. 3, the first metal mesh layer 10 includes a plurality of first mesh wires. Each touch electrode 11 includes part of the plurality of first mesh wires which are electrically connected to each other and extended in different directions. Each fingerprint identification electrode 12 includes part of the plurality of first mesh wires which are electrically connected to each other and extended in different directions. In other words, part of the plurality of first mesh wires of the first metal mesh layer 10 are electrically connected to each other to form one touch electrode 11 or one fingerprint identification electrode 12. It shall also be noted that the width of the first mesh wire can be set according to the product design requirements and the field process level, and the widths of the first mesh wires at different positions can be the same or different.

A plurality of first meshes are formed by the plurality of first mesh wires in the first metal mesh layer 10, and each first mesh is formed by the first mesh wires extended in different directions. It will be readily appreciated that the touch electrode 11 is larger than the fingerprint identification electrode 12, and that the number of the first meshes in the touch electrode 11 is larger than that in the fingerprint identification electrode 12. As an example, each touch electrode 11 includes more than one first mesh, and each fingerprint identification electrode 12 includes at least one first mesh.

In some embodiments of the present application, the second metal mesh layer 20 includes a plurality of second mesh wires. Each fingerprint lead wire 21 includes part of the plurality of second mesh wires which are electrically connected to each other and extended in different directions. In other words, part of the plurality of second mesh wires of the second metal mesh layer 20 extended in different directions are electrically connected to each other to form one fingerprint lead wire 21.

In an embodiment, the fingerprint lead wire 21 is formed by second mesh wires oriented in different directions. Different fingerprint lead wires 21 can include second meshes at different positions and with different numbers, so that the plurality of fingerprint lead wires 21 have substantially the same reactance, which facilitates the arrangement of the fingerprint identification electrodes 12 and the fingerprint lead wires 21, and improves the accuracy of the fingerprint identification.

In some embodiments of the present application, the second mesh wires are respectively overlapped with the first mesh wires in the corresponding positions. An orthographic projection of each of the plurality of second mesh wires on the substrate 40 does not exceed an orthographic projection of corresponding one of the plurality of first mesh wires on the substrate 40. As a result, the addition of the second metal mesh layer 20 has no additional effect on the optical uniformity of the touch panel, thereby ensuring the overall optical uniformity of the touch panel.

In this embodiment, by overlapping the second mesh wires respectively with the first mesh wires in the corresponding positions, i.e., by arranging the second mesh wire not exceed the corresponding first mesh wire, the second mesh wire would not affect the light-emitting of the touch panel, which would maximize the overall optical uniformity of the touch panel.

As an example, a plurality of second meshes are formed in the second metal mesh layer 20, and each of the fingerprint lead wires 21 includes more than one second mesh. Specifically, the second mesh is formed by crossing the second mesh wires.

In general, the first metal mesh layer 10 and the second metal mesh layer 20 preferably employ a metal mesh pattern with the same size and style to simplify the preparation process. For the arrangement area of the second mesh wires, the orthographic projections of the second mesh wires on the substrate 40 are coincident with the orthographic projections of the first mesh wires on the substrate 40, ensuring the overall optical uniformity of the touch panel.

In the above embodiments, the second mesh wires can be provided on the entire touch panel, or can be provided only on a region where the fingerprint lead wires 21 are located.

In other embodiments of the present application, the orthographic projections of the second mesh wires on the substrate 40 and the orthographic projections of the first mesh wires on the substrate 40 can also be staggered with each other, which facilitates the reduction of parasitic capacitances between the fingerprint lead wires 21 and the touch electrodes 11, thereby reducing the signal interference.

As an example, the orthographic projections of the vertexes of the second meshes on the substrate 40 and the orthographic projections of the centers of the first meshes on the substrate 40 are coincident, and/or the orthographic projections of the centers of the second meshes on the substrate 40 and the orthographic projections of the vertexes of the first meshes on the substrate 40 are coincident, which can minimize the parasitic capacitances between the fingerprint lead wires 21 and the touch electrodes 11.

In some embodiments of the present application, at least part of the plurality of fingerprint lead wires 21 have substantially the same reactance.

In some embodiment, the plurality of the fingerprint lead wires 21 have substantially the same reactance, so that the transmission signals of the fingerprint lead wires 21 can better reflect the difference in the fingerprint, which improves the accuracy of the fingerprint identification.

The fingerprint lead wire is formed by second mesh wires oriented in different directions, and different fingerprint lead wires can include second meshes at different positions and with different numbers, so that the plurality of fingerprint lead wires can have substantially the same reactance, which facilitates the arrangement design of the fingerprint identification electrodes and the fingerprint lead wires, and improves the accuracy of fingerprint identification.

In practical application, the reactance difference between any two of the plurality of fingerprint lead wires 21 is within a predetermined range to avoid affecting the accuracy of fingerprint identification.

In some embodiments of the present application, the second metal mesh layer 20 further includes a plurality of touch lead wires 22. Each of the plurality of touch lead wires 22 is electrically connected to corresponding one of the plurality of touch electrodes 11.

In this embodiment, the second metal mesh layer 20 further includes the plurality of touch lead wires 22. Each of the plurality of touch lead wires 22 is electrically connected to corresponding one of the plurality of touch electrodes 11. For the touch electrodes 11 adjacent to the fingerprint identification region B, the corresponding touch lead wires 22 can be effectively prevented from touching wires in the fingerprint identification region B, thereby ensuring the optical uniformity. In addition, the touch lead wires 22 and the fingerprint lead wires 21 are arranged in the same layer, which is convenient for the subsequent bonding operation.

The touch lead wire 22 includes multiple second mesh wires electrically connected to each other. As an example, each touch lead wire 22 includes more than one second mesh.

The touch lead wires 22 are connected to the touch electrodes adjacent to the fingerprint identification region B (by passing through the fingerprint identification region) or leads predetermined touch electrodes 11 to a non-display area of the touch panel. For the former, the touch lead wire 22 can avoid performing touch wiring arrangement in a region in the first metal mesh layer 10 corresponding to the fingerprint identification region B, thereby improving the optical uniformity of the touch panel. For the latter, both the touch lead wires 22 and the fingerprint lead wires 21 are located in the second metal mesh layer 20, which is convenient for the subsequent bonding operation. In addition, it is convenient for keeping the reactances of different touch lead wires 22 electrically connected to the outside more consistent, thereby improving the accuracy of identification and product performance.

It shall be noted that the fingerprint lead wires 21 or the touch lead wires 22 as shown in FIG. 3 are merely intended to facilitate the understanding of the embodiments, and not intended to limit the particular patterns and the extending directions of the fingerprint lead wires 21 or the touch lead wires 22.

Figure 4:
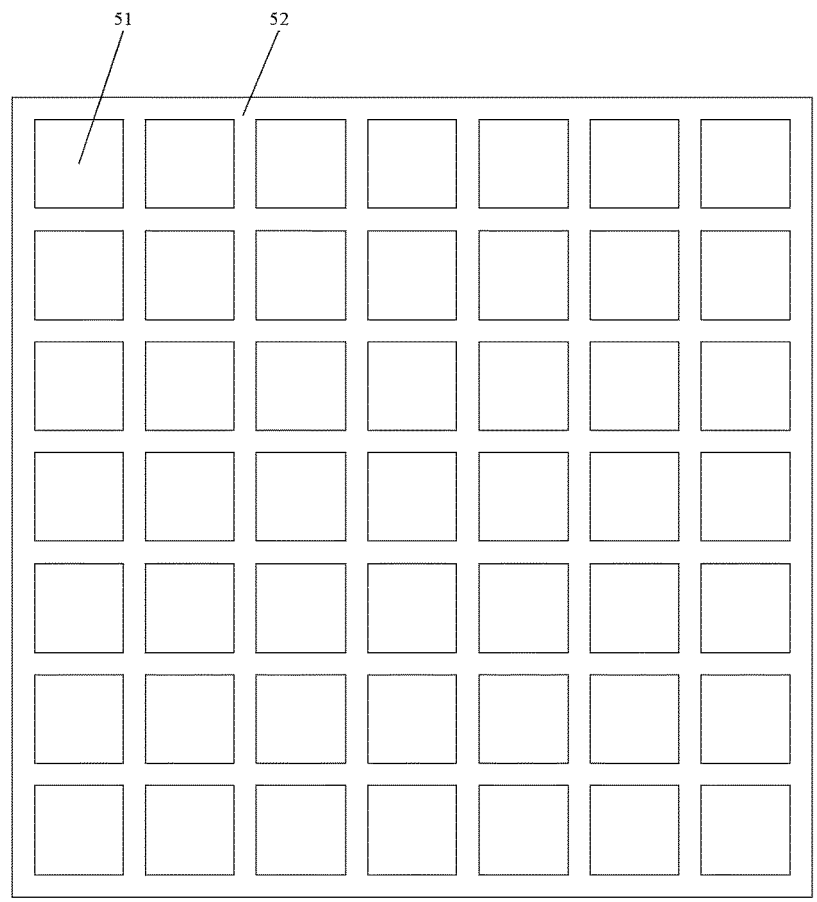
FIG. 4 is a schematic structural view of a light emitting layer according to an embodiment of the present application.

As shown in FIG. 4, the light-emitting layer 50 includes a plurality of light-emitting regions 51 spaced from each other, and a shielding region 52 located between the light-emitting regions 51. The orthographic projections of the first mesh wires of the first metal mesh layer 10 on the light-emitting layer 50 and the orthographic projections of the second mesh wires of the second metal mesh layer 20 on the light-emitting layer 50 are both located within the shielding region 52. In practical application, there is a predetermined distance between the first mesh wires or the second mesh wires and the corresponding edge of the shielding region 52, so that the output of light emitted by the light-emitting layer 50 is not affected, and thus the image display is ensured.

As the orthographic projections of the first mesh wires of the first metal mesh layer on the light-emitting layer and the orthographic projection of the second mesh wires of the second metal mesh layer on the light-emitting layer are both located within the shielding region, the light emitted by the light-emitting layer can be output from the light-emitting region, so that it can avoid affecting the image display.

In some embodiments of the present application, as shown in FIG. 3, the touch panel includes a plurality of fingerprint sensing electrodes 13 and a plurality of fingerprint driving electrodes 14. Each fingerprint sensing electrode 13 includes part of the plurality of fingerprint identification electrodes 12 arranged sequentially along a first direction a, and at least one first fingerprint connection wire 15 connecting two fingerprint identification electrodes 12 adjacent to each other along the first direction a. Each fingerprint driving electrode 14 includes part of the plurality of fingerprint identification electrodes 12 arranged sequentially along a second direction b, and at least one second fingerprint connection wire 23 connecting two fingerprint identification electrodes 12 adjacent to each other along the second direction b. The first fingerprint connection wire 15 or the second fingerprint connection wire 23 is located in the second metal mesh layer 20, that is, the connection wire for bridging the fingerprint identification electrodes to form the fingerprint sensing electrode 13 or the fingerprint driving electrode 14 is disposed in the second metal mesh layer 20.

As the first fingerprint connection wire or the second fingerprint connection wire is located in the second metal mesh layer, i.e., the connection wire for bridging the fingerprint identification electrodes is located in the second metal mesh layer, the process can be simplified, the cost can be reduced, and the touch panel can be thinner.

As an example, the first fingerprint connection wire 15 and the fingerprint identification electrode 12 are arranged in the same layer, and the second fingerprint connection wire 23 is located in the second metal mesh layer 20.

In this way, the touch panel with the mutually capacitive fingerprint identification structure still has only two metal film layers. The metal mesh layer 20 can also be considered to be integrated with the bridging metal layer. Therefore, the process can be simplified, the cost can be reduced, and the touch panel can be thinner.

As an example, as shown in FIG. 3, the first direction a is perpendicular to the second direction b, which is convenient for the wiring arrangement of the first fingerprint connection wire 15 and the second fingerprint connection wire 23.

In practical application, each fingerprint sensing electrode 13 is connected to one corresponding fingerprint lead wire 21, and each fingerprint driving electrode 14 is connected to one corresponding fingerprint lead wire 21.

Referring again to FIG. 3, the touch panel includes a plurality of touch sensing electrodes 16 and a plurality of touch driving electrodes 17. Each touch sensing electrode 16 includes part of the plurality of touch electrodes 11 arranged sequentially along a third direction c, and at least one first touch connection wire 18 connecting two touch electrodes 11 adjacent to each other along the third direction c. Each touch driving electrode 17 includes part of the plurality of touch electrodes 11 arranged sequentially along a fourth direction d, and at least one second touch connection wire 24 connecting two touch electrodes 11 adjacent to each other along the fourth direction d. The first touch connection wire 18 or the second touch connection wire 24 is located in the second metal mesh layer 20. As an example, the first touch connection wire 18 and the touch electrode 11 are located in the same layer, and the second touch connection wire 24 is located in the second metal mesh layer 20. Similarly, by the above design, it is possible to simplify the process, reduce the cost, and make the touch panel thinner.

As an example, as shown in FIG. 3, the third direction c is perpendicular to the fourth direction d, which is convenient for wiring arrangement of the first touch connection wire 18 and the second touch connection wire 24.

As an example, as shown in FIG. 3, the third direction c is at an angle of 45-degree with the first direction a, which is convenient for the arrangement of the touch sensing electrode 16, the touch driving electrode 17, the fingerprint sensing electrode 13, and the fingerprint driving electrode 14.

The first direction can be perpendicular to the second direction, the third direction can be perpendicular to the fourth direction, and the third direction can be at an angle of 45-degree with the first direction, which is convenient for wiring arrangement.

In practical application, each touch sensing electrode 16 is connected to one corresponding touch lead wire 22, and each touch driving electrode 17 is connected to one corresponding touch lead wire 22.

In the above embodiments, the second fingerprint connection wire 23 and the second touch connection wire 24 are both formed by the second mesh wires. It will be readily appreciated that in other embodiments of the present application, the second fingerprint connection wire and the second touch connection wire can also be disposed in a separate bridging metal layer from the first metal mesh layer 10 and the second metal mesh layer 20. Alternatively, the touch sensing electrode 16 and the touch driving electrode 17, or the fingerprint sensing electrode 13 and the fingerprint driving electrode 14 can be disposed in different layers. That is, the touch panel includes two first metal mesh layers 10 with the second mesh wires as described above. Generally, the arrangement density of the fingerprint electrodes is much greater than the arrangement density of the conventional touch electrodes, and the density difference between the electrode patterns can cause a difference in the optical effect and thus affect the display effect of the OLED display device.

In view of the above, in some embodiments of the present application, as shown in FIG. 3, each touch electrode 11 includes a plurality of sub-electrodes 19 electrically connected to each other. An orthographic projection of the sub-electrode 19 along the direction perpendicular to the touch panel is a first figure, and the orthographic projection of the fingerprint identification electrode 12 along the direction perpendicular to the touch panel is a second figure. The first figure is consistent with the second figure. Specifically, the orthographic projection in the direction perpendicular to the touch panel is the orthographic projection on the substrate 40. It shall be noted that the shape of any one of the fingerprint identification electrode 12 is consistent with the shape of the sub-electrode 19. The difference in the hues of the electrode blocks shown in FIG. 3 is only for better illustrating the positions of the fingerprint sensing electrode 13 and the fingerprint driving electrode 14, as well as the positions of the touch sensing electrode 16 and the touch driving electrode 17.

For example, the orthographic projection of the fingerprint identification electrode 12 on the substrate 40 is a diamond having a side length of 1, and the orthographic projection of the sub-electrode 19 on the substrate 40 is also a diamond having a side length 1. As another example, the orthographic projection of the fingerprint identification electrode 12 on the substrate 40 is a circle having a radius of r, and the orthographic projection of the sub-electrode 19 on the substrate 40 is also a circle having a radius of r. It shall be noted that the shape of the fingerprint identification electrode refers to an overall contour of a single fingerprint identification electrode. Considering actual design requirements and process errors, the shape of the fingerprint identification electrode is not a geometric pattern of strict significance.

In practical application, the first shape and the second shape include, but are not limited to, a regular shape such as a circle, a rectangle, a diamond, or the like, and also can be an irregular shape.

By the above design, the figures of the sub-electrode 19 and the fingerprint identification electrode 12 are the same and the optical effects thereof are consistent, which can improve the display effect of the OLED display device. Moreover, the fingerprint identification electrode 12 is integrated within the touch panel, and no additional fingerprint identification module is required, so that the cost is reduced, the structure is simplified, and it is advantageous to use the same driving chip to achieve functions of fingerprint identification, touch, and display.

In some embodiments of the present application, the arrangement density of the sub-electrodes 19 in the touch region A is equal to the arrangement density of the fingerprint identification electrodes 12 in the fingerprint identification region B, and the center distance of two adjacent sub-electrodes 19 is equal to the center distance of two adjacent fingerprint identification electrodes 12, so that the overall optical uniformity of the touch panel is better.

As each touch electrode includes a plurality of sub-electrodes, and the figure of the orthographic projection of the sub-electrode along the direction perpendicular to the touch panel is consistent with the figure of the orthographic projection of the fingerprint identification electrode along the direction perpendicular to the touch panel, the patterns formed by the touch electrodes and the fingerprint identification electrodes have the same density and consistent optical effect, which can improve the display effect of the OLED display device.

It shall be noted that, the above "above" and "below" are defined in the stacking direction of the touch panel. The substrate 40 is located at the bottom of the touch panel, and in the order of stacking, the one stacked first is located under the one stacked later.

Figure 5:
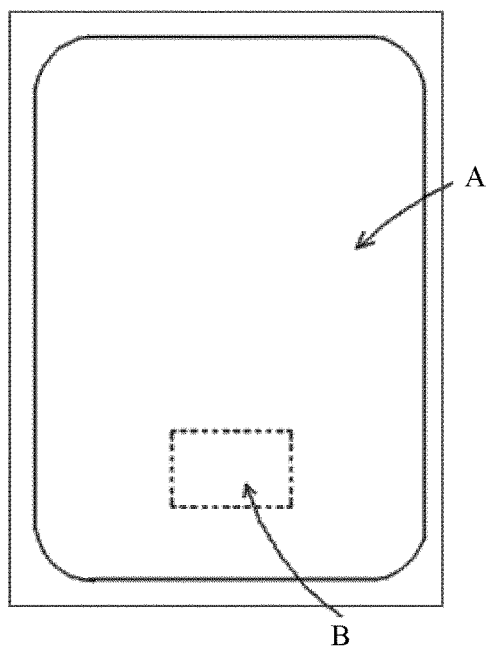
FIG. 5 is a schematic structural view of a display apparatus according to an embodiment of the present application.

Based on the same inventive concept, as shown in FIG. 5, a display apparatus is further provided in embodiments of the present application. The display apparatus includes a control chip and the touch panel in the above embodiments. The fingerprint identification region B is surrounded by the touch region A. The control chip is provided in a bonding region and is electrically connected to the plurality of fingerprint lead wires.

It will be appreciated that the display apparatus in the embodiments of the present application can be any product or component with display function, such as an OLED display apparatus, a Quantum Dot Light Emitting Diodes (QLED) display apparatus, an electronic paper, a mobile phone, a tablet computer, a television, a display, a notebook computer, a digital photo frame, a navigator, a wearable apparatus, an Internet of Things apparatus, or the like, and the embodiments disclosed herein are not limited thereto.

What is claimed is:

1. A touch panel, having a touch region and a fingerprint identification region, and comprising:
    a first metal mesh layer, comprising a plurality of touch electrodes disposed in the touch region, a plurality of fingerprint identification electrodes disposed in the fingerprint identification region, and a plurality of first mesh wires, a plurality of first meshes being formed in the first metal mesh layer, each first mesh of the plurality of first meshes being formed by part of the plurality of first mesh wires extended in different directions, and each touch electrode of the plurality of touch electrodes comprising part of the plurality of first meshes;
    a second metal mesh layer, comprising a plurality of fingerprint lead wires, wherein each fingerprint lead wire of the plurality of fingerprint lead wires is electrically connected to corresponding one of the plurality of fingerprint identification electrodes; and
    a dielectric layer, disposed between the first metal mesh layer and the second metal mesh layer;
    wherein the dielectric layer is provided with a plurality of contact holes, and each fingerprint lead wire of the plurality of fingerprint lead wires is electrically connected to corresponding one of the plurality of fingerprint identification electrodes by corresponding one of the plurality of contact holes.

2. The touch panel of claim 1, wherein the second metal mesh layer comprises a plurality of second mesh wires, and each fingerprint lead wire of the plurality of fingerprint lead wires comprises part of the plurality of second mesh wires that are electrically connected to each other and extend in different directions.

3. The touch panel of claim 2, wherein the second metal mesh layer comprises a plurality of second meshes formed by the plurality of second mesh wires, and each fingerprint lead wire of the plurality of fingerprint lead wires comprises part of the plurality of second meshes.

4. The touch panel of claim 2, wherein at least part of the plurality of fingerprint lead wires have the same reactance.

5. The touch panel of claim 2, further comprising:
    a substrate disposed under the first metal mesh layer and the second metal mesh layer, wherein each of the plurality of second mesh wires is overlapped with one of the plurality of first mesh wires in corresponding position, and an orthographic projection of each of the plurality of second mesh wires on the substrate does not exceed an orthographic projection of corresponding one of the plurality of first mesh wires on the substrate.

6. The touch panel of claim 5, further comprising:
    a light-emitting layer disposed under the first metal mesh layer and the second metal mesh layer, wherein the light-emitting layer comprises a plurality of light-emitting regions spaced from each other and a shielding region located between the light-emitting regions, and an orthographic projection of the plurality of first mesh wires of the first metal mesh layer on the light-emitting layer and an orthographic projection of the plurality of second mesh wires of the second metal mesh layer on the light-emitting layer are both located in the shielding region.

7. The touch panel of claim 5, wherein each fingerprint identification electrode of the plurality of fingerprint identification electrodes comprises at least one of the plurality of first meshes, and each touch electrode of the plurality of touch electrodes has a greater number of the first meshes than each fingerprint identification electrode of the plurality of fingerprint identification electrodes.

8. The touch panel of claim 5, wherein the second metal mesh layer is located between the first metal mesh layer and the substrate.

9. The touch panel of claim 2, further comprising:
    a substrate disposed under the first metal mesh layer and the second metal mesh layer, wherein a plurality of orthographic projections of the second mesh wires on the substrate and a plurality of orthographic projections of the first mesh wires on the substrate are arranged in a staggered manner.

10. The touch panel of claim 9, wherein the plurality of second mesh wires intersect with each other to form a plurality of second meshes, the plurality of first mesh wires intersect with each other to form the plurality of first meshes, and a plurality of orthographic projections of a plurality of vertexes of the plurality of second meshes on the substrate are coincident with a plurality of orthographic projections of a plurality of centers of the plurality of first meshes on the substrate; and/or the plurality of second mesh wires intersect with each other to form a plurality of second meshes, the plurality of first mesh wires intersect with each other to form a plurality of first meshes, and a plurality of orthographic projections of a plurality of centers of the plurality of second meshes on the substrate are coincident with a plurality of orthographic projections of a plurality of vertexes of the plurality of first meshes on the substrate.

11. The touch panel of claim 9, wherein the second metal mesh layer is located between the first metal mesh layer and the substrate.

12. The touch panel of claim 1, wherein each touch electrode of the plurality of touch electrodes comprises a plurality of sub-electrodes, an orthographic projection of each sub-electrode of the plurality of sub-electrodes along a direction perpendicular to the touch panel is a first figure, an orthographic projection of each fingerprint identification electrode of the plurality of fingerprint identification electrodes along the direction perpendicular to the touch panel is a second figure, and the first figure is consistent with the second figure.

13. The touch panel of claim 12, wherein an arrangement density of the plurality of sub-electrodes in the touch region is equal to an arrangement density of the plurality of fingerprint identification electrodes in the fingerprint identification region.

14. The touch panel of claim 1, further comprising:
a plurality of fingerprint sensing electrodes; and
a plurality of fingerprint driving electrodes;
wherein each fingerprint sensing electrode of the plurality of fingerprint sensing electrodes comprises part of the plurality of fingerprint identification electrodes arranged sequentially along a first direction, and at least one first fingerprint connection wire connecting two of the plurality of fingerprint identification electrodes adjacent along the first direction;
wherein each fingerprint driving electrode of the plurality of fingerprint driving electrodes comprises part of the plurality of fingerprint identification electrodes arranged sequentially along a second direction, and at least one second fingerprint connection wire connecting two of the plurality of fingerprint identification electrodes adjacent along the second direction; and
wherein the at least one first fingerprint connection wire or the at least one second fingerprint connection wire is located in the second metal mesh layer.

15. The touch panel of claim 14, further comprising:
a plurality of touch sensing electrodes; and
a plurality of touch driving electrodes;
wherein each touch sensing electrode of the plurality of touch sensing electrodes comprises part of the plurality of touch electrodes arranged sequentially along a third direction, and at least one first touch connection wire connecting two of the plurality of touch electrodes adjacent along the third direction;
wherein each touch driving electrode of the plurality of touch driving electrodes comprises part of the plurality of touch electrodes arranged sequentially along a fourth direction, and at least one second touch connection wire connecting two of the plurality of touch electrodes adjacent along the fourth direction;
wherein the at least one first touch connection wire or the at least two second touch connection wire is located in the second metal mesh layer; and
wherein the second metal mesh layer further comprises a plurality of touch lead wires, and each touch lead wire of the plurality of touch lead wires is electrically connected to corresponding one of the plurality of touch electrodes.

16. The touch panel of claim 15, wherein the first direction is perpendicular to the second direction, and the third direction is perpendicular to the fourth direction; and the third direction forms an angle of 45 degrees with the first direction.

17. The touch panel of claim 15, wherein the at least one first touch connection wire and the at least two second touch connection wire are located in different layers; and/or
wherein the at least one first fingerprint connection wire and the at least one second fingerprint connection wire are located in different layers.

18. The touch panel of claim 1, wherein the plurality of first meshes are of the same size and the plurality of first meshes are uniformly arranged.

19. A display apparatus, comprising a touch panel, wherein the touch panel has a touch region and a fingerprint identification region and comprises:
a first metal mesh layer, comprising a plurality of touch electrodes disposed in the touch region, a plurality of fingerprint identification electrodes disposed in the fingerprint identification region, and a plurality of first mesh wires, a plurality of first meshes being formed in the first metal mesh layer, each first mesh of the plurality of first meshes being formed by part of the plurality of first mesh wires extended in different directions, and each touch electrode of the plurality of touch electrodes comprising part of the plurality of first meshes;
a second metal mesh layer, comprising a plurality of fingerprint lead wires, wherein each fingerprint lead wire of the plurality of fingerprint lead wires is electrically connected to corresponding one of the plurality of fingerprint identification electrodes; and
a dielectric layer, disposed between the first metal mesh layer and the second metal mesh layer;
wherein the dielectric layer is provided with a plurality of contact holes, and each fingerprint lead wire of the plurality of fingerprint lead wires is electrically connected to corresponding one of the plurality of fingerprint identification electrodes by corresponding one of the plurality of contact holes.

20. The display apparatus of claim 19, wherein the second metal mesh layer comprises a plurality of second mesh wires, each fingerprint lead wire of the plurality of fingerprint lead wires comprises part of the plurality of second mesh wires that are electrically connected to each other and extend in different directions, a plurality of second meshes is formed by the plurality of second mesh wires, and each fingerprint lead wire of the plurality of fingerprint lead wires comprises part of the plurality of second meshes.

* * * * *